United States Patent
Yu et al.

(10) Patent No.: US 9,401,982 B2
(45) Date of Patent: *Jul. 26, 2016

(54) DEVICE CAPABLE OF NOTIFYING OPERATION STATE CHANGE THEREOF THROUGH NETWORK AND COMMUNICATION METHOD OF THE DEVICE

(71) Applicant: Samsung Electronics Co., Ltd., Gyeonggi-do (KR)

(72) Inventors: Seung-dong Yu, Gyeonggi-do (KR); Woo-yong Chang, Gyeonggi-do (KR); Se-jun Park, Gyeonggi-do (KR); Min-jeong Moon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/847,885

(22) Filed: Sep. 8, 2015

(65) Prior Publication Data

US 2015/0381791 A1 Dec. 31, 2015

Related U.S. Application Data

(63) Continuation of application No. 14/270,684, filed on May 6, 2014, now Pat. No. 9,131,065, which is a continuation of application No. 12/861,522, filed on Aug. 23, 2010, now Pat. No. 8,718,638.

(30) Foreign Application Priority Data

Aug. 21, 2009 (KR) ........................ 10-2009-0077873
Oct. 30, 2009 (KR) ........................ 10-2009-0104662

(51) Int. Cl.
*H04M 3/00* (2006.01)
*H04M 1/725* (2006.01)
(Continued)

(52) U.S. Cl.
CPC .......... *H04M 1/7253* (2013.01); *H04L 12/2827* (2013.01); *H04M 1/57* (2013.01); *H04M 1/72527* (2013.01); *H04M 1/72597* (2013.01); *H04M 11/08* (2013.01)

(58) Field of Classification Search
USPC ........ 455/412.1, 412.2, 414.1, 420, 424, 425, 455/426.1, 457, 566, 145
See application file for complete search history.

(56) References Cited

U.S. PATENT DOCUMENTS 5,809,212 A   9/1998   Shasha
6,574,662 B2  6/2003   Sugiyama et al.
(Continued)

FOREIGN PATENT DOCUMENTS

CN   1961298     5/2007
CN   101304350   11/2008
(Continued)

OTHER PUBLICATIONS

Korean Office Action dated Nov. 14, 2015 issued in counterpart application No. 10-2009-0104662, 16 pages.
(Continued)

*Primary Examiner* — Dominic Rego
(74) *Attorney, Agent, or Firm* — The Farrell Law Firm, P.C.

(57) ABSTRACT

A method of notifying an operation state change of a device is provided. The method includes receiving a message by a first device; identifying, by the first device, that a second device is currently connected to the first device through a network; and transmitting, by the first device, information regarding the message to the second device. The information is displayed on a display unit of the second device.

8 Claims, 9 Drawing Sheets

(51) Int. Cl.
*H04L 12/28* (2006.01)
*H04M 1/57* (2006.01)
*H04M 11/08* (2006.01)

(56) References Cited

U.S. PATENT DOCUMENTS

| | | | |
|---|---|---|---|
| 6,631,407 B1 | 10/2003 | Mukaiyama et al. | |
| 6,731,201 B1 | 5/2004 | Bailey et al. | |
| 6,906,617 B1 | 6/2005 | Van der Meulen | |
| 6,924,727 B2 | 8/2005 | Nagaoka et al. | |
| 6,930,598 B2 | 8/2005 | Weiss | |
| RE40,032 E | 1/2008 | van Bokhorst et al. | |
| 7,376,393 B2 | 5/2008 | Ono et al. | |
| 7,395,326 B2 | 7/2008 | Hikida et al. | |
| 7,930,433 B2 | 4/2011 | Sugai et al. | |
| 7,970,413 B2 | 6/2011 | Oshimi et al. | |
| 8,019,875 B1 | 9/2011 | Nielsen | |
| 8,117,470 B2 | 2/2012 | Oh et al. | |
| 8,122,506 B2 | 2/2012 | Harvey et al. | |
| 8,150,982 B2 | 4/2012 | Zhang et al. | |
| 8,185,594 B2 | 5/2012 | Duncan et al. | |
| 8,646,000 B2 * | 2/2014 | Kang | G06F 3/0482 345/633 |
| 8,738,809 B2 * | 5/2014 | Shoji | G09G 5/006 710/3 |
| 8,762,240 B2 | 6/2014 | Sogo et al. | |
| 9,131,065 B2 | 9/2015 | Yu et al. | |
| 2002/0015481 A1 * | 2/2002 | Abel | H04M 7/006 379/90.01 |
| 2002/0037699 A1 * | 3/2002 | Kobayashi | H04W 40/246 455/41.2 |
| 2002/0193149 A1 | 12/2002 | Tanaka et al. | |
| 2003/0041134 A1 | 2/2003 | Sugiyama et al. | |
| 2003/0135666 A1 | 7/2003 | Kim | |
| 2005/0021610 A1 | 1/2005 | Bozionek et al. | |
| 2005/0189423 A1 * | 9/2005 | Kurobe | G06K 7/10811 235/462.45 |
| 2005/0261018 A1 * | 11/2005 | Yamamoto | H04W 52/242 455/522 |
| 2006/0036672 A1 | 2/2006 | Cha et al. | |
| 2006/0036678 A1 * | 2/2006 | Rhim | H04L 67/36 709/203 |
| 2006/0040705 A1 | 2/2006 | Kawakami et al. | |
| 2007/0092256 A1 | 4/2007 | Nozue et al. | |
| 2007/0237115 A1 | 10/2007 | Bae et al. | |
| 2007/0287478 A1 * | 12/2007 | Park | A63F 13/12 345/530 |
| 2007/0300188 A1 | 12/2007 | Kim | |
| 2008/0013504 A1 | 1/2008 | Nishibayashi et al. | |
| 2008/0143517 A1 | 6/2008 | Goffin | |
| 2008/0161034 A1 | 7/2008 | Akiyama | |
| 2008/0174415 A1 | 7/2008 | Tanida et al. | |
| 2008/0214206 A1 * | 9/2008 | Shimanuki | H04M 3/42017 455/456.1 |
| 2008/0224834 A1 | 9/2008 | Oosaka et al. | |
| 2008/0252928 A1 * | 10/2008 | Takatani | G06F 21/31 358/1.15 |
| 2008/0266174 A1 | 10/2008 | Medina Herrero | |
| 2009/0073871 A1 | 3/2009 | Ko et al. | |
| 2009/0124286 A1 | 5/2009 | Hellfalk et al. | |
| 2009/0210152 A1 | 8/2009 | Kawa | |
| 2009/0293070 A1 * | 11/2009 | Greeff | G06F 13/102 719/321 |
| 2009/0306793 A1 * | 12/2009 | Takebayashi | H04L 12/2809 700/8 |
| 2010/0005166 A1 | 1/2010 | Chung | |
| 2010/0014529 A1 | 1/2010 | Takechi et al. | |
| 2010/0057921 A1 | 3/2010 | Zhang et al. | |
| 2010/0208746 A1 | 8/2010 | Rahman | |
| 2010/0257239 A1 | 10/2010 | Roberts | |
| 2011/0045809 A1 | 2/2011 | Yu et al. | |
| 2011/0054644 A1 | 3/2011 | Baek et al. | |
| 2012/0110635 A1 | 5/2012 | Harvey et al. | |
| 2012/0166660 A1 | 6/2012 | Zhang et al. | |

FOREIGN PATENT DOCUMENTS

| | | |
|---|---|---|
| JP | 2002-217922 | 8/2002 |
| JP | 2002-344568 | 11/2002 |
| JP | 2002-359670 | 12/2002 |
| JP | 2002-369257 | 12/2002 |
| JP | 2003-162626 | 6/2003 |
| JP | 2003-179545 | 6/2003 |
| JP | 2004-015169 | 1/2004 |
| JP | 2004-048280 | 2/2004 |
| JP | 2004-341736 | 12/2004 |
| JP | 2005-033635 | 2/2005 |
| JP | 2006-018623 | 1/2006 |
| JP | 2006-345425 | 12/2006 |
| JP | 2009-010468 | 1/2009 |
| KR | 1020040007857 | 1/2004 |
| KR | 1020040035243 | 4/2004 |
| KR | 1020040047325 A | 5/2004 |
| KR | 1020050094247 | 9/2005 |
| KR | 1020060112555 A | 1/2006 |
| KR | 1020060015965 | 2/2006 |
| WO | WO 2007/107863 | 9/2007 |
| WO | WO 2008/138260 | 11/2008 |

OTHER PUBLICATIONS

Russian Office Action dated Nov. 10, 2015 issued in counterpart application No. 2012106026/08, 45 pages.
Canadian Office Action dated Aug. 20, 2013 issued in counterpart application No. 2,769,216.
Russian Office Action dated Aug. 20, 2013 issued in counterpart application No. 2012106026/08.
Indonesian Office Action dated Jun. 26, 2013 issued in counterpart application No. WO0201201055.
Japanese Office Action dated Feb. 23, 2015 issued in counterpart application No. 2010-186287.
Canadian Office Action dated Apr. 7, 2015 issued in counterpart application No. 2,769,216.
Chinese Office Action dated Jun. 3, 2015 issued in counterpart application No. 201080037128.5.
Taiwanese Search Report dated Oct. 23, 2014 issued in counterpart application No. 10321477710.
Chinese Office Action dated Nov. 4, 2014 issued in counterpart application No. 201080037128.5.
Japanese Appeal Decision dated Jan. 18, 2016 issued in counterpart application No. 2010-186287, 35 pages.
Chinese Office Action dated Mar. 16, 2016 issued in counterpart application No. 201080037128.5, 20 pages.

* cited by examiner

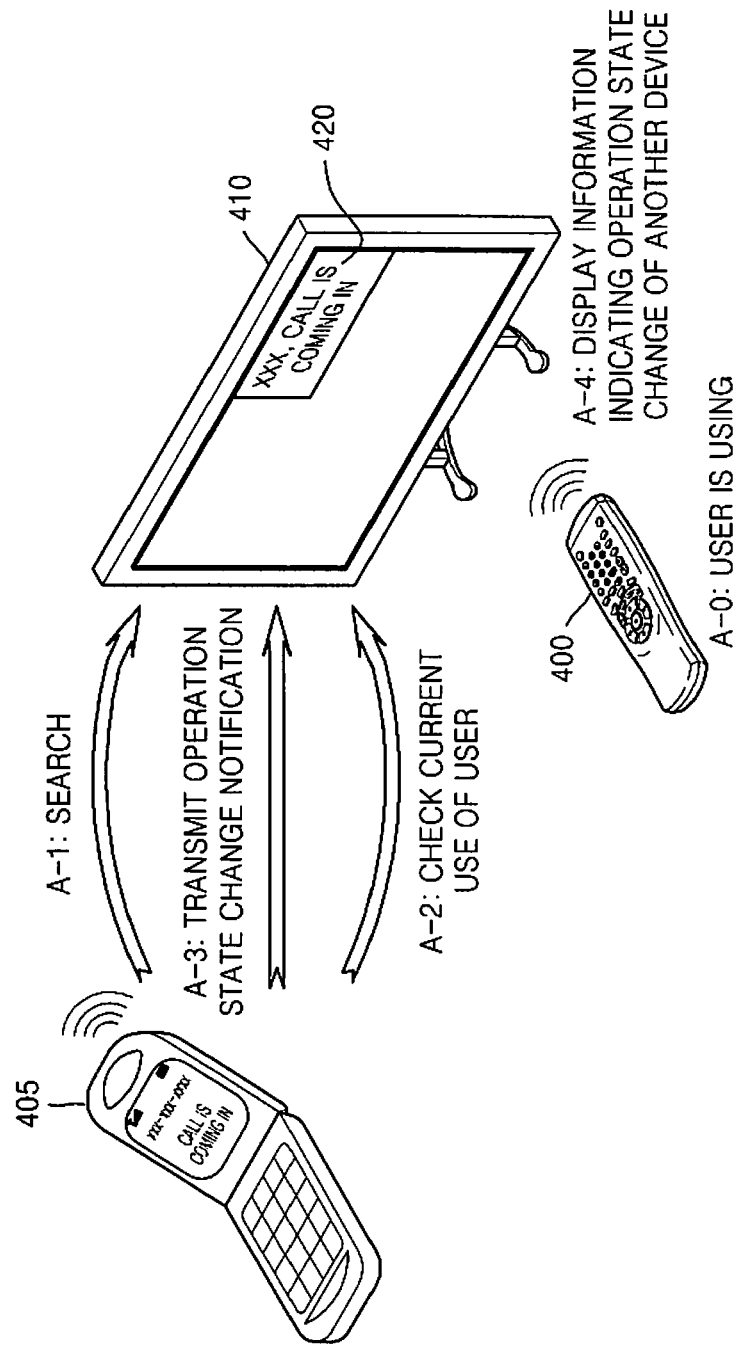

US 9,401,982 B2

DEVICE CAPABLE OF NOTIFYING OPERATION STATE CHANGE THEREOF THROUGH NETWORK AND COMMUNICATION METHOD OF THE DEVICE

PRIORITY

This application is a Continuation Application of U.S. patent application Ser. No. 14/270,684, filed in the U.S. Patent and Trademark Office on May 6, 2014, now U.S. Pat. No. 9,131,065, which is a Continuation Application of U.S. patent application Ser. No. 12/861,522, filed in the U.S. Patent and Trademark Office on Aug. 23, 2010, now U.S. Pat. No. 8,718,638, and claims priority under 35 U.S.C. §119(a) to Korean Patent Application No. 10-2009-0077873, filed on Aug. 21, 2009, and Korean Patent Application No. 10-2009-0104662, filed on Oct. 30, 2009, in the Korean Intellectual Property Office, the content of each of which is incorporated herein by reference.

BACKGROUND OF THE INVENTION

1. Field of the Invention

The present invention relates to the sharing of information between devices through a network.

2. Description of the Related Art

Most electronic devices are able to communicate through a network, and are equipped with a display screen for displaying various information. However, users are not able to carry all of the electronic devices they own. As a result, these users cannot often take an immediate action on an electronic device, which undergoes an operation state change.

SUMMARY OF THE INVENTION

The present invention has been made to address at least the above problems and/or disadvantages and to provide at least the advantages described below.

Accordingly, an aspect of the present invention provides a technique for sharing information regarding a state change between devices capable of performing network communication.

According to an aspect of the present invention, a method is provided for notifying a second device of a message received by a first device. The method includes receiving a message by the first device; identifying, by the first device, that the second device is currently connected to the first device through a network; and transmitting, by the first device, information regarding the message to the second device. The information is displayed on a display unit of the second device.

According to an additional aspect of the present invention, a first device is provided, which includes a network communication unit configured to identify that a second device is currently connected to the first device through a network; and a transmitting unit configured to transmit, when a message is received by the first device, information regarding the message to the second device. The transmitted information is displayed on a display unit of the second device.

BRIEF DESCRIPTION OF THE DRAWINGS

The above and other aspects, features and advantages of the present invention will become more apparent from the following detailed description when taken in conjunction with the accompanying drawings, in which:

FIG. 4A is a diagram illustrating a first method for information exchange between a device undergoing an operation state change and a device capable of notifying an operation state change of another device, according to an embodiment of the present invention;

DETAILED DESCRIPTION OF EMBODIMENTS OF THE PRESENT INVENTION

Figure 1:
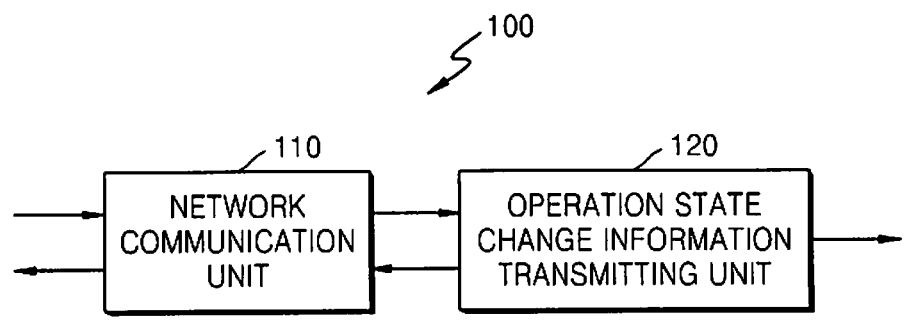
FIG. 1 is a block diagram illustrating a device capable of notifying an operation state change thereof, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

FIG. 1 is a block diagram illustrating a device 100 capable of notifying an operation state change thereof, according to an embodiment of the present invention.

The device 100 capable of notifying an operation state change thereof includes a network communication unit 110 and an operation state change information transmitting unit 120.

The network communication unit 110 can be used by a user and can perform network communication with devices capable of performing network communication. The devices capable of performing network communication can be used by a single user and may be included in a network established to allow the devices to perform mutual communication. An example of such a network may be Wireless Fidelity (Wi-Fi)

network. However, an operation environment is not limited to a network environment complying with the wireless Wi-Fi standard.

If an operation state change of the current device 100 included in the network of the devices occurs, the operation state change information transmitting unit 120 searches for at least one device currently used by a user among the other devices included in the network. The operation state change information transmitting unit 120 generates information about the operation state change of the current device 100 and transmits the generated information to at least one found device that is currently used by the user.

The transmitted information about the operation state change of the current device 100 is intended to allow the user to handle the operation state change of the current device 100 by notifying the user of whether the operation state of the current device 100 changes through a display unit of another device currently used by the user. To indicate the information about the operation state change of the current device 100, target devices included in the network of the devices may include display units.

The information about the operation state change of the current device 100 may be output from the operation state change information transmitting unit 120 directly or through the network communication unit 110.

The current device 100 capable of notifying an operation state change thereof may be any type of an electronic device that can perform networking and that can be used by a user. An example of the operation state change of the device 100 may include changing states of various functions of various electronic devices. For example, output of a ring tone of a mobile phone, completion of a washing operation of a washing machine, arrival of the broadcasting start time of a reserved program in a set-top box, completion of downloading of an electronic sound source in an audio equipment, elapsing of the operation time of a reserved cooking function of a microwave oven, and the like may be operation state changes of the device 100 capable of notifying an operation state change thereof.

The device 100 capable of notifying an operation state change thereof may search for another device currently used by the user through the network of the devices after a predetermined time has elapsed if the user does not respond to the operation state change of the device 100 for the predetermined time. For example, when the device 100 is a cellular phone, if there is no response from the user during the 20-second ringing of the phone, the device 100 may subsequently search for another device currently used by the user through the network of the devices.

If a device currently used by the user to which information about the operation state change of the current device 100 is to be transmitted cannot be found in the network of the devices, the operation state change information transmitting unit 120 may search for the device currently used by the user in a sharing network accessible by the current device 100. The operation state change information transmitting unit 120 may scan the other devices in a device list database owned by the current device 100 to search for the device currently used by the user.

The operation state change information transmitting unit 120 may transmit a search signal indicating a search for the device currently by the user to at least one device included in the network of the devices. Instead of transmitting the search signal, the current device 100 may access target devices to analyze if the user currently uses the target devices, thereby directly finding the device currently used by the user.

The device 100 capable of notifying an operation state change thereof may select a target device to which the information about the operation state change of the current device 100 is to be transmitted, by obtaining information indicating the current use or non-use by the user, which is generated and broadcast by the target device.

For the device 100 capable of notifying an operation state change thereof, the user may selectively set the use of an operation state change notifying function to on or off.

The information about the operation state change may include notification information indicating the occurrence of the operation state change of the device 100 and detail information indicating details of the operation state change.

The operation state change information transmitting unit 120 may convert the details of the operation state change of the device 100 into a format that can be displayed by the target device before transmission.

The detail information may be converted into a format that can be reproduced by the target device through a management server of the network before transmission.

For example, the operation state change of the device 100 may include reception of a text-based message such as a Short Message Service (SMS) message. A message of the device 100 may be converted into text-format data that can be reproduced by the target device and then displayed on the target device. In case of the operation state change where the device 100 receives a text-based message combined with image data or audio data, such as a Multimedia Message Service (MMS) message, the message may be converted into image-format data, audio-format data, and text-format data and then displayed on the target device.

Figure 2:
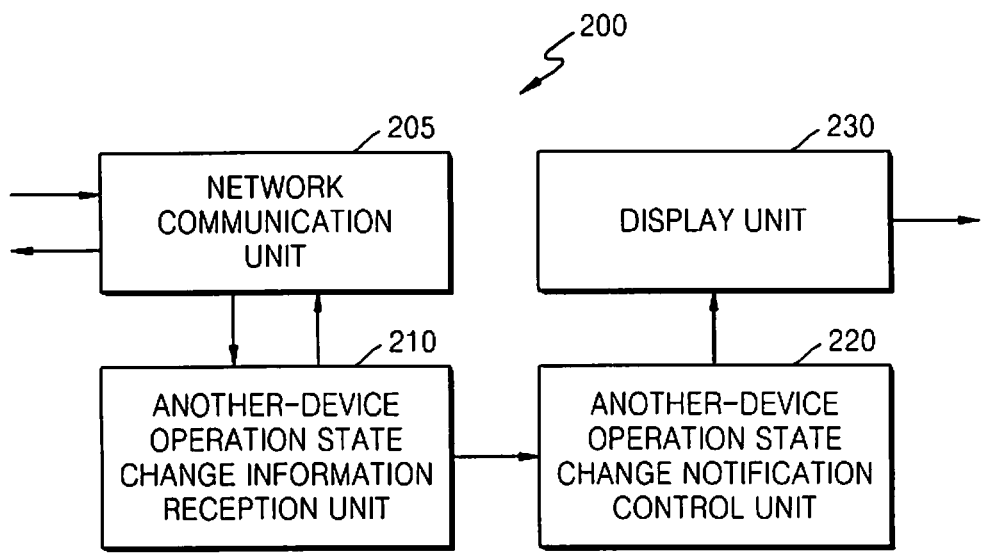
FIG. 2 is a block diagram illustrating a device capable of notifying an operation state change of another device, according to an embodiment of the present invention.

FIG. 2 is a block diagram illustrating a device 200 capable of notifying an operation state change of another device, according to an embodiment of the present invention.

The device 200 capable of notifying an operation state change of another device includes a network communication unit 205, an other-device operation state change information reception unit 210, an other-device operation state change notification control unit 220, and a display unit 230. The device 200 capable of notifying an operation state change of another device may be included in the network of the devices, together with the device 100 capable of notifying an operation state change thereof, which has been described above with reference to FIG. 1.

The network communication unit 205 can be used by a user and performs network communication with the devices capable of performing network communication.

The other-device operation state change information reception unit 210 searches for at least one device which is currently used by the user in the network of the devices, and receives, from a first device included in the network of the devices, information about an operation state change of the first device. The first device may be the device 100 described above with reference to FIG. 1.

The information about the operation state change of the first device may be input to the other-device operation state change information reception unit 210 directly or through the network communication unit 205.

The device 200 capable of notifying an operation state change of another device may receive a search signal indicating a search for the device currently used by the user, from the first device. The device 200 may recognize whether the user currently uses the device 200 based on the search signal and provide a signal indicating the current use or non-use of the user to the first device.

The device 200 may accept an access permit request from the first device, which requests a direct access to the device 200 to analyze if the user currently uses the device 200.

The device 200 may periodically generate and broadcast a signal indicating the current use or non-use of the user. The first device searching for the device currently used by the user may find out the device currently used by the user by obtaining the signal indicating the current use or non-use of the user, generated and broadcast by the device 200.

To determine whether the user currently uses a predetermined device, it is determined whether an instruction or information from the user has been input during a past predetermined time, whether the user logs in the device, or whether the user is situated within a sensor sensing range of the device.

The device 200 capable of notifying an operation state change of another device may forward information indicating the operation state change, received from the first device, to another device included in the network of the devices.

The other-device operation state change notification control unit 220 performs a control operation such that notification information indicating the occurrence of an operation state change of the first device is displayed on the display unit 230. The information about the operation state change of the first device may be displayed by using a notification display window. The display manner of the notification display window, such as position, size, transparency, flickering frequency, color, and the like, may be set.

The information about the operation state change may include notification information indicating the occurrence of the operation state change of the first device and detail information indicating details of the operation state change.

The other-device operation state change notification control unit 220 may convert the details of the operation state change of the first device into a format that can be displayed by the device 200.

The detail information may be converted into a format that can be reproduced by the device 200 through a management server of the network and then received by, the other-device operation state change information reception unit 210.

The other-device operation state change information reception unit 210 may receive the detail information transmitted after being converted by the first device into data in a format that can be reproduced by the device 200.

The other-device operation state change notification control unit 220 may perform a control operation such that a reception acknowledgement window for the notification information indicating the occurrence of the operation state change of the first device is displayed on the display unit 230. Upon reception of a reception acknowledgement from the user, the details of the operation state change of the first device may be displayed on the display unit 230 based on the detail information in a reproducible format.

Thus, if the operation state change of the first device is reception of an SMS message, the SMS message of the first device may be converted into text-format data that can be reproduced by the device 200 and then displayed on the display unit 230. In case of the operation state change where the first device receives a text-based message combined with image data or audio data, such as an MMS message, the message may be converted into image-format data, audio-format data and text-format data that can be reproduced by the device 200 and then displayed on the display unit 230. After completion of reception or display of the notification information or the detail information associated with the operation state change of the first device, the device 200 may inform the first device that the user acknowledges the operation state change.

According to an embodiment of the present invention, by using the device 100 capable of notifying an operation state change thereof and the device 200 capable of notifying an operation state change of another device, the device 100 currently undergoing an operation state change automatically searches for the device 200 currently used by the user to allow the user to effectively respond to the operation-state-changed device 100. In addition, to search for a device currently used by the user, devices included in an accessible network are sequentially scanned, thereby intelligently finding a target device to which notification information indicating the occurrence of an operation state change is to be transmitted.

With reference to FIGS. 1 and 2, the device 100 capable of notifying an operation state change thereof and the device 200 capable of notifying an operation state change of another device have been described separately. However, by incorporating all components of the device 100 and the device 200 in a single device, information about an operation state change of a current device may be transmitted to the other devices included in a network of devices, and information about an operation state change of another device may be received and displayed on a notification display window.

Figure 3A:
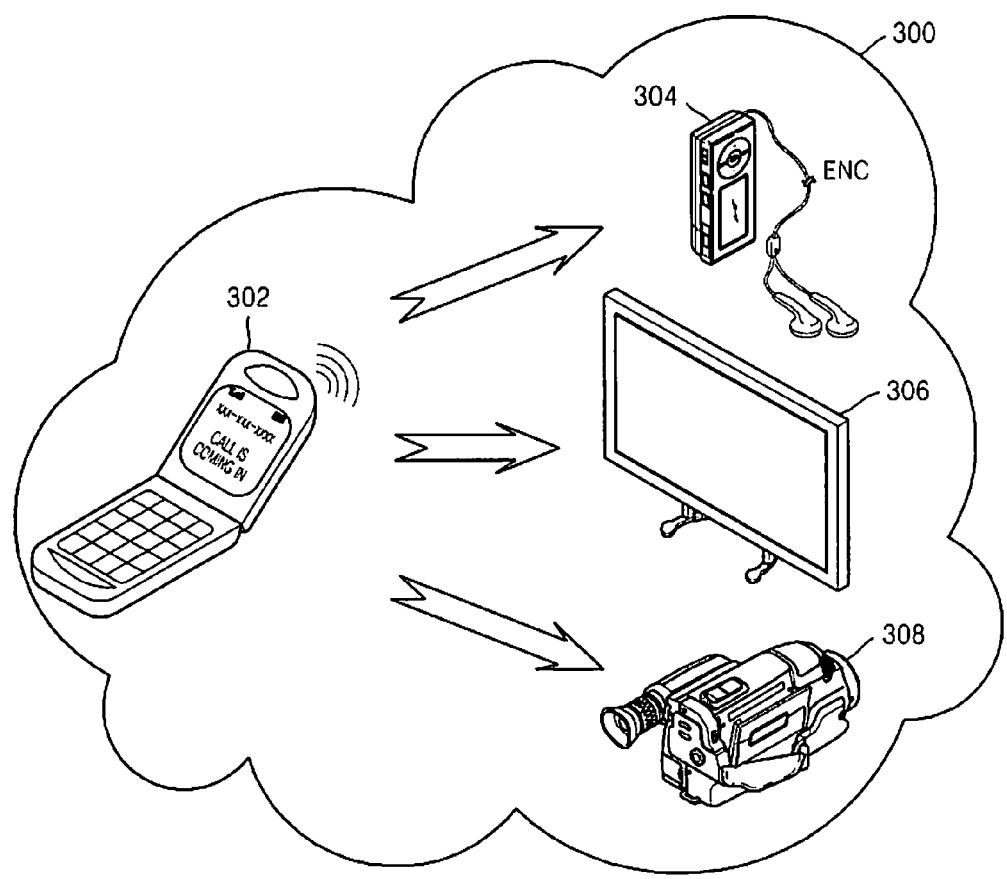
FIG. 3A is a diagram illustrating a network of devices, according to an embodiment of the present invention.

FIG. 3A is a diagram illustrating a network 300 of devices, according to an embodiment of the present invention.

Included in the network 300 of devices are a cellular phone 302, a small-size audio equipment 304, a digital TV 306, and a digital camcorder 308. All of the cellular phone 302, the small-size audio equipment 304, the digital TV 306, and the digital camcorder 308 can perform network communication and are mutually registered as devices included in the same network 300.

For example, the cellular phone 302 may be an example of the device 100 capable of notifying an operation state change thereof and the other devices included in the network 300, that is, the audio equipment 304, the digital TV 306, and the digital camcorder 308 may be examples of the device 200 capable of notifying the operation state change of another device described with reference to FIG. 2.

If there is no response from the user to the ringing of the cellular phone 302, the cellular phone 302 searches for a target device to which information about the current operation state change is to be transmitted in the network 300. The cellular phone 302 may search for a device currently used by the user among the other devices of the network 300, i.e., the audio equipment 304, the digital TV 306, and the digital camcorder 308. Specifically, the cellular phone 302 may transmit information that notifies the operation state change indicating the ringing of the cellular phone 302 to the found device currently used by the user.

Figure 3B:
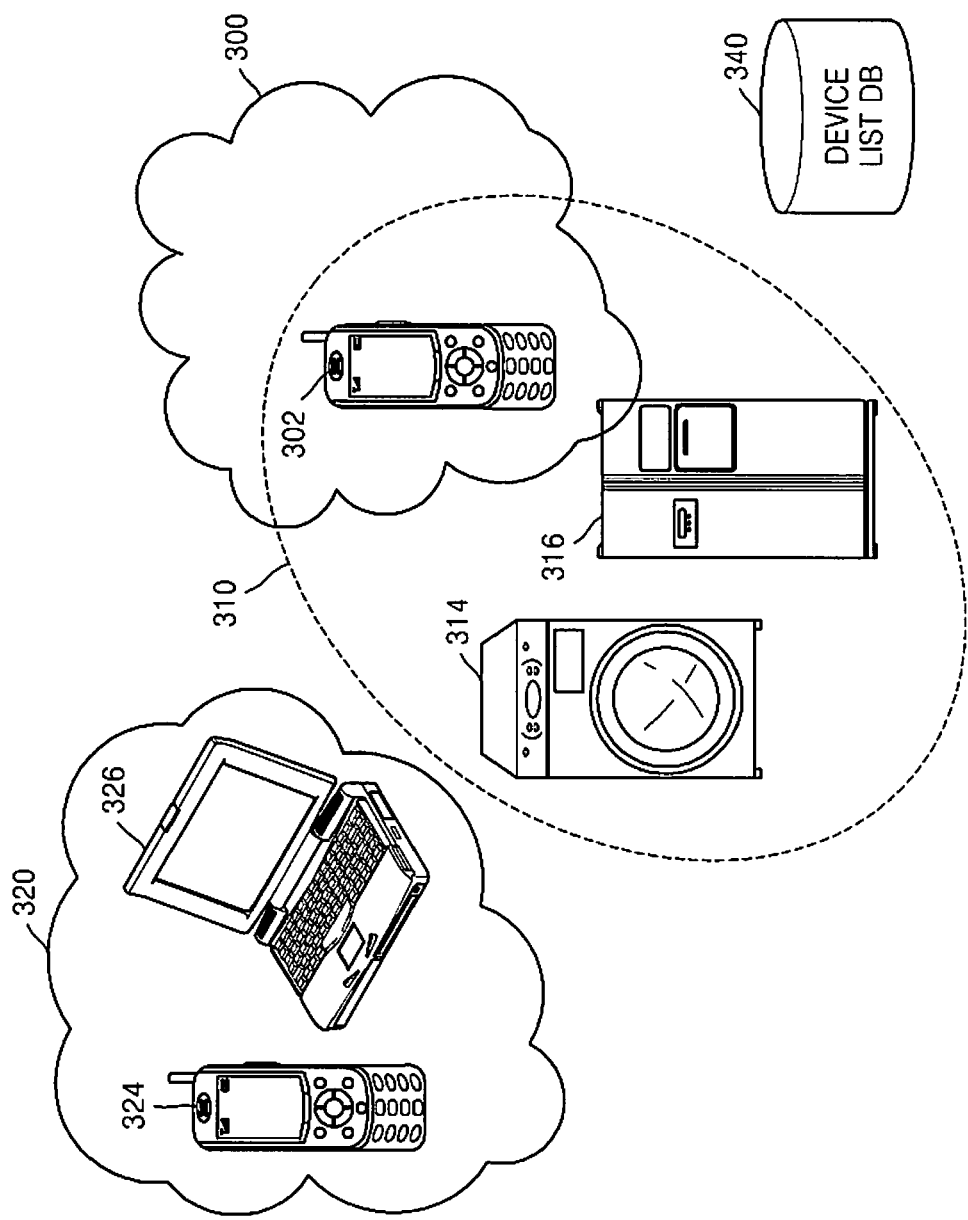
FIG. 3B is a diagram illustrating networks of devices and types of accessible networks, according to an embodiment of the present invention.

FIG. 3B is a diagram illustrating networks of devices and types of accessible networks, according to an embodiment of the present invention.

The cellular phone 302 searches for a device currently used by the user in the network 300 among devices provided to share user information with the device 100. However, if the device currently used by the user is not found in the network 300, the cellular phone 302 may secondarily search a sharing network 310, which includes a washing machine 314, a refrigerator 316, and the cellular phone 302.

The cellular phone 302 may search for the device currently used by the user through another cellular phone 324 and a notebook 326, which are included in a neighboring infra network 320. If the cellular phone 302 includes a device list database 340 including a list of devices capable of performing network communication, the cellular phone 302 may search for the device currently used by the user in the list of devices when the user cannot search for the device currently used by the user in neighboring accessible networks.

FIGS. 4A, 4B, 4C, 4D, 4E, and 4F are diagrams illustrating methods for performing information exchange between a device undergoing an operation state change and a device capable of notifying an operation state change of another device, according to embodiments of the present invention. In the embodiments illustrated in FIGS. 4A through 4F, a cellular phone 405 is an example of the device 100 capable of notifying an operation state change thereof, and a digital TV 410 is an example of the device 200 capable of notifying an operation state change of another device.

FIG. 4A is a diagram illustrating a first method for performing information exchange between a device undergoing an operation state change and a device capable of notifying an operation state change of another device, according to an embodiment of the present invention.

Referring to FIG. 4A, a user is using the digital TV 410 by means of a remote control 400 in operation A-0. Although the cellular phone 405 of the user, which is located in another room, rings, the user fails to sense the ringing of the cellular phone 405.

If there is no response from the user in spite of the ringing of the cellular phone 405 for a predetermined time, the cellular phone 405 transmits to the digital TV 410 a search signal indicating a search for a device currently used by the user in a network of devices, in operation A-1.

The cellular phone 405 checks if the user currently uses the cellular phone in operation A-2. The digital TV 410 may accept an access permit request of the cellular phone 405, or may provide information about the current use requested by the cellular phone 405.

To determine whether the user currently uses the digital TV 410, the cellular phone 405 may analyze a history regarding whether there has been an input of a signal or an instruction from the user within a predetermined time. The cellular phone 405 may determine whether the user currently uses the digital TV 410 based on information about whether the user logs in the digital TV 410 or whether the user is sensed by various sensors mounted on the digital TV 410.

If the cellular phone 405 determines that the user is currently using the digital TV 410, it transmits information indicating the ringing of the cellular phone 405, specifically, notification information indicating the occurrence of an operation state change to the digital TV 410 in operation A-3.

The digital TV 410 receives the operation state change notification indicative of the ringing of the cellular phone 405 from the cellular phone 405 and displays information indicating the ringing of the cellular phone 405 of the user on a partial area 420 of the display screen of the digital TV 410 in operation A-4.

Figure 4B:
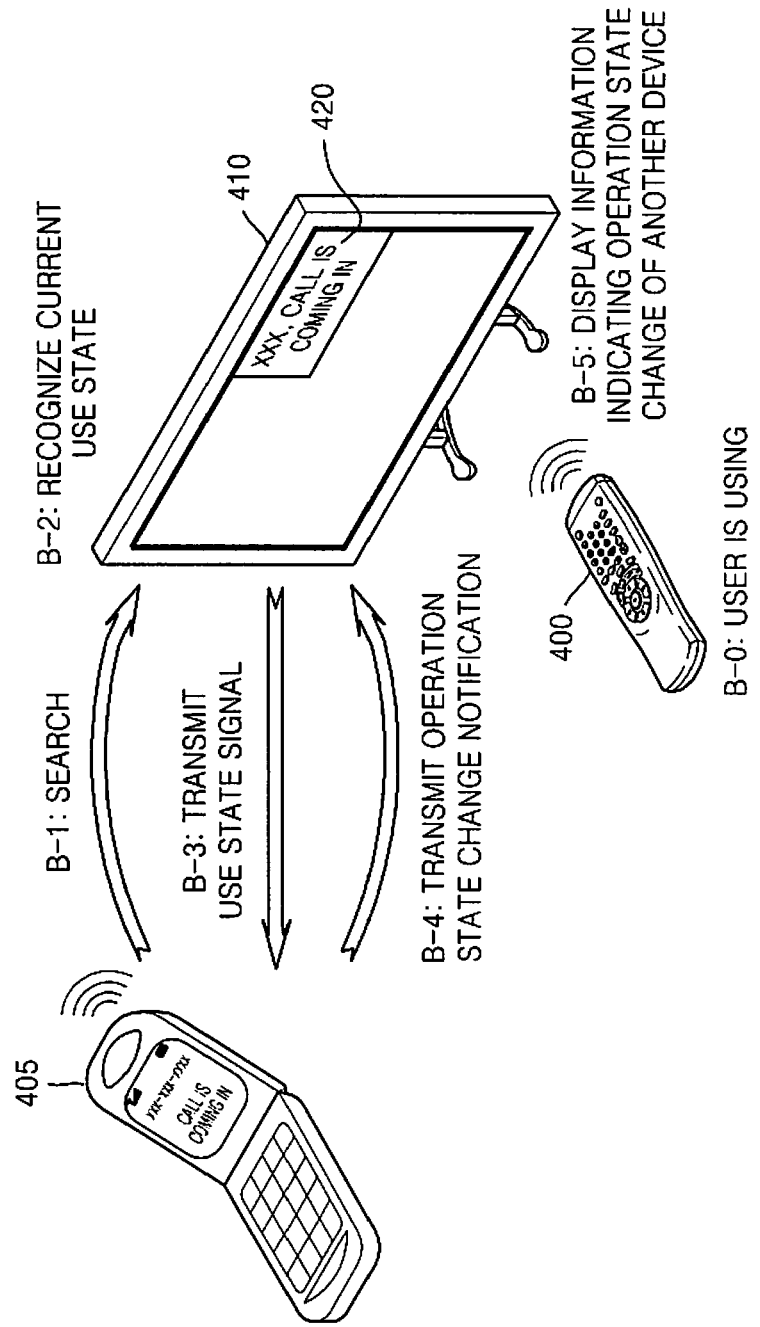
FIG. 4B is a diagram illustrating a second method for information exchange between a device undergoing an operation state change and a device capable of notifying an operation state change of another device, according to an embodiment of the present invention.

FIG. 4B is a diagram illustrating a second method for performing information exchange between the device undergoing an operation state change and the device capable of notifying an operation state change of another device, according to an embodiment of the present invention.

Referring to FIG. 4B, the user is using the digital TV 410 by means of the remote control 400 in operation B-0. Although the cellular phone 405 of the user, which is located in another room, rings, the user fails to sense the ringing of the cellular phone 405.

If there is no response from the user in spite of the ringing of the cellular phone 405 for a predetermined time, the cellular phone 405 transmits to the digital TV 410 a search signal indicating a search for the device currently used by the user in a network of devices in operation B-1.

The digital TV 410 then receives the search signal of the cellular phone 405 and recognizes the current use state of the user in operation B-2. To determine whether the user currently uses the digital TV 410, the digital TV 410 may analyze whether there has been an input of a signal or an instruction from the user within a predetermined time, whether the user logs in the digital TV 410, or whether the user is sensed by various sensors mounted on the digital TV 410.

If the digital TV 410 determines that the user currently uses the digital TV 410, it transmits a use state signal indicating the user is currently using the digital TV 410 to the cellular phone 405 in operation B-3.

The cellular phone 405 transmits information indicating the ringing of the cellular phone 405, specifically, notification information indicating the occurrence of an operation state change to the digital TV 410 in operation B-4.

The digital TV 410 receives the operation state change notification indicative of the ringing of the cellular phone 405 from the cellular phone 405 and displays information indicating the ringing of the cellular phone 405 of the user on the partial area 420 of the display screen of the digital TV 410 in operation B-5.

Figure 4C:
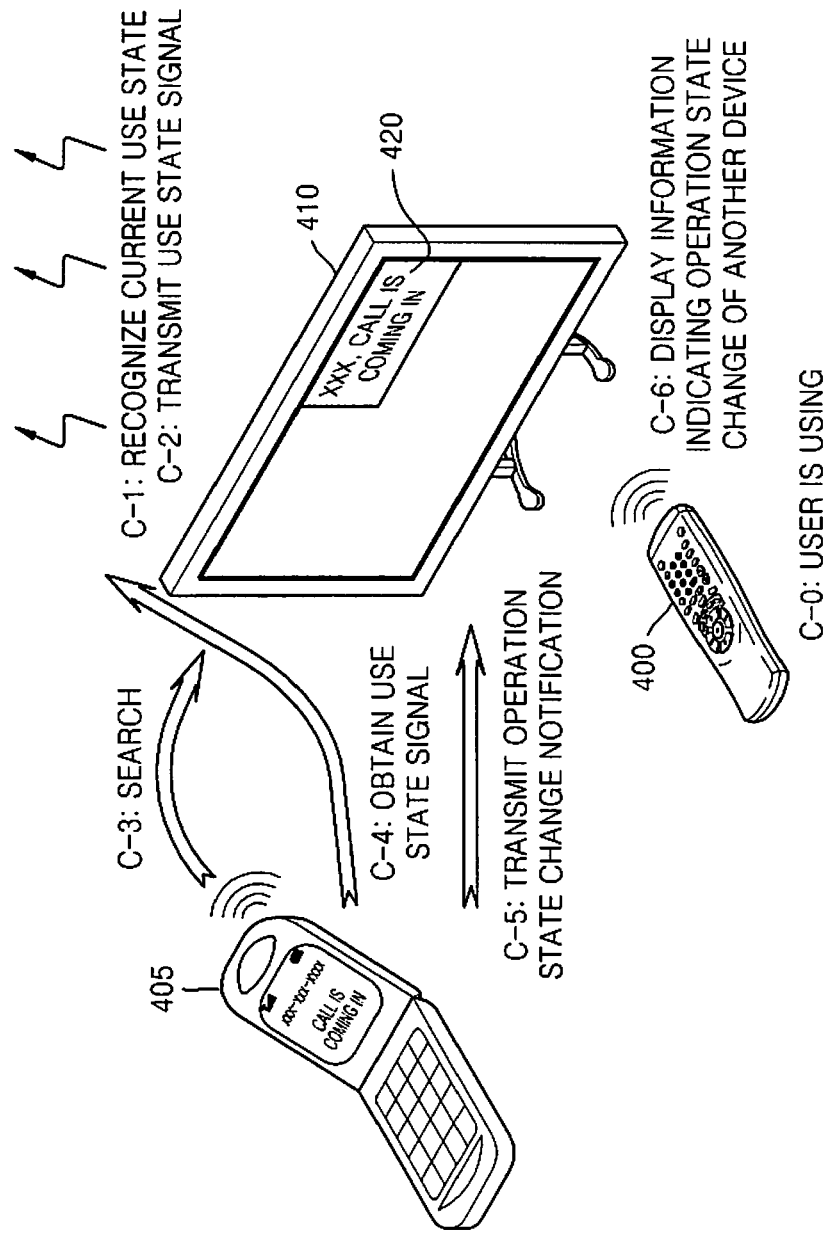
FIG. 4C is a diagram illustrating a third method for information exchange between a device undergoing an operation state change and a device capable of notifying an operation state change of another device, according to an embodiment of the present invention.

FIG. 4C is a diagram illustrating a third method for performing information exchange between the device undergoing an operation state change and the device capable of notifying an operation state change of another device, according to an embodiment of the present invention.

Referring to FIG. 4C, the user is using the digital TV 410 by means of the remote control 400 in operation C-0. Although the cellular phone 405 of the user, which is located in another room, rings, the user fails to sense the ringing of the cellular phone 405.

The digital TV 410 frequently checks the current use state of the user in operation C-1. If the user currently uses the digital TV 410, the digital TV 410 broadcasts a use state signal pertaining to the current use state of the user in operation C-2.

If there is no response from the user in spite of the ringing of the cellular phone 405 for a predetermined time, the cellular phone 405 searches for a device currently used by the user in a network of devices in operation C-3.

The cellular phone 405 recognizes that the user is currently using the digital TV 410 by obtaining the use state signal pertaining to the current use state broadcast by the digital TV 410 in operation C-4.

The cellular phone 405 transmits information indicating the ringing of the cellular phone 405, specifically, notification information indicating an operation state change to the digital TV 410 in operation C-5.

The digital TV 410 receives the operation state change notification indicative of the ringing of the cellular phone 405 from the cellular phone 405 and displays information indicating the ringing of the cellular phone 405 of the user on the partial area 420 of the display screen of the digital TV 410 in operation C-6.

Figure 4D:
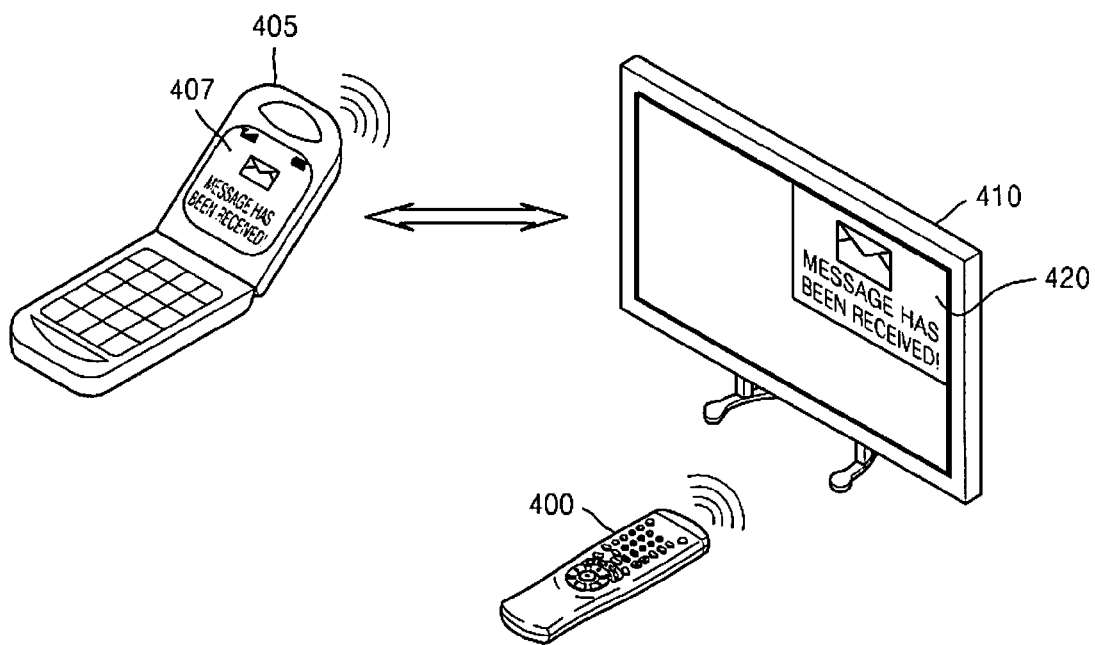
FIG. 4D is a diagram illustrating examples of a device undergoing an operation state change and a device capable of notifying an operation state change of another device, according to an embodiment of the present invention.
Figure 4E:
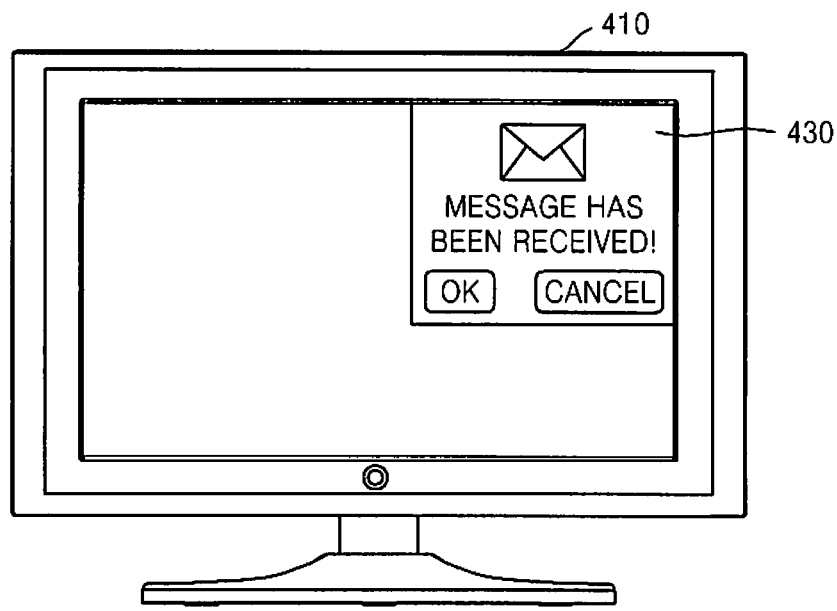
FIGS. 4E and 4F are diagrams illustrating examples of using a device undergoing an operation state change and a device capable of notifying an operation state change of another device, according to an embodiment of the present invention.
Figure 4F:
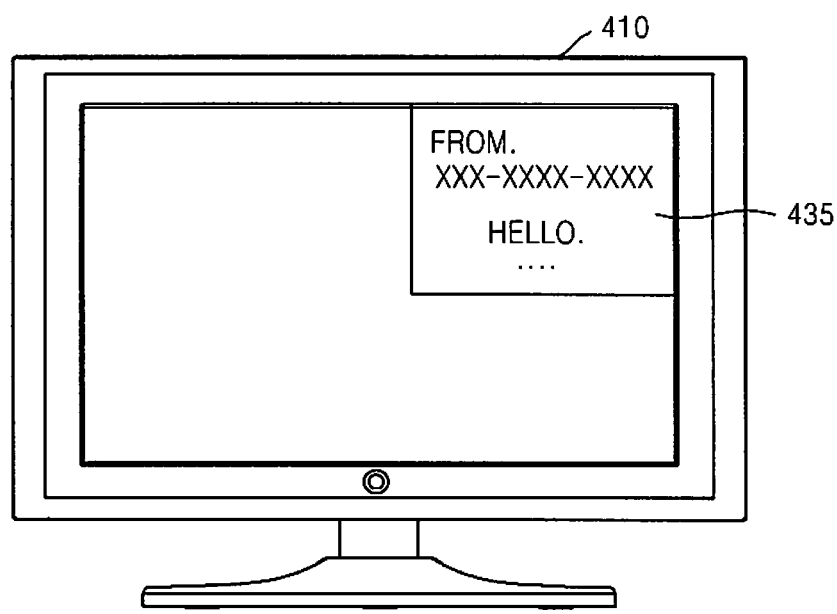

FIGS. 4D, 4E, and 4F are diagrams illustrating examples of the cellular phone 405 undergoing an operation state change and the digital TV 410 capable of notifying an operation state change of another device when a message is received by the cellular phone 405 of the user.

FIG. 4D is a diagram illustrating a device undergoing an operation state change and a device capable of notifying an operation state change of another device, according to an embodiment of the present invention.

Referring to FIG. 4D, the user is using the digital TV 410 by means of the remote control 400. Although an SMS message has been received in the cellular phone 405 of the user, which is located in another room, the user fails to sense the reception of the SMS message in the cellular phone 405.

For exchange of information regarding an operation state change between devices, the cellular phone 405 and the digital TV 410 may exchange information regarding the message reception therebetween through the first method, the second method, and the third method described above.

The digital TV 410 receives notification information indicating the reception of the SMS message in the cellular phone 405, and displays information indicating the SMS message has been received in the cellular phone 405 of the user on a partial area 420 of the display screen.

FIGS. 4E and 4F are diagrams illustrating examples of using a device undergoing an operation state change and a device capable of notifying an operation state change of another device, according to an embodiment of the present invention.

The digital TV 410 may receive detail information indicating details of an SMS message, together with notification information indicating the reception of the SMS message in the cellular phone 405. The digital TV 410 displays a message reception notification display window 430 on the screen based on the notification information, and may receive a user input regarding whether to see the received SMS message.

If the user acknowledges the notification information through the digital TV 410, the digital TV 410 may display an SMS message display window 435 of the cellular phone 405 on the screen based on the received detail information of the SMS message.

If the received detail information of the SMS message is not in a format which can be reproduced by the digital TV 410 and displayed on the screen, the digital TV 410 may convert the details information into data in a reproducible format and display the SMS message display window 435 on the screen.

Alternatively, a management server of the network among devices of the user may convert the detail information of the SMS message into a format that can be reproduced by the digital TV 410, and transmit the converted information to the digital TV 410, which then receives the format-converted information and displays the SMS message display window 435 on the screen.

Alternatively, the cellular phone 405 of the user may convert the detail information of the SMS message into a format that can be reproduced by the digital TV 410, and transmit the converted information to the digital TV 410, which then receives the format-converted information and displays the SMS message display window 435 on the screen.

For example, if the cellular phone 405 receives a text-based message such as an SMS message, the received message may be converted into text-format data that can be reproduced by the digital TV 410 and then displayed on the digital TV 410. If the cellular phone 405 undergoes an operation state change by the reception of a text-based message combined with image or audio data, such as an MMS message, the message may be converted into data including image, audio, and text data that can be reproduced by the digital TV 410 and then displayed on the digital TV 410.

After reception or completion of display of the notification information indicating the message reception or the details information of the message in the cellular phone 405, the digital TV 410 may inform the cellular phone 405 that the user acknowledges the message.

The device 100 capable of notifying an operation state change thereof and the device 200 capable of notifying an operation state change of another device, which have been described with reference to FIGS. 1, 2, 3A, 3B, 4A, 4B, 4C, 4D, 4E, and 4F may operate under the control of a central server such as a home server which manages and controls a network among devices.

Figure 5:
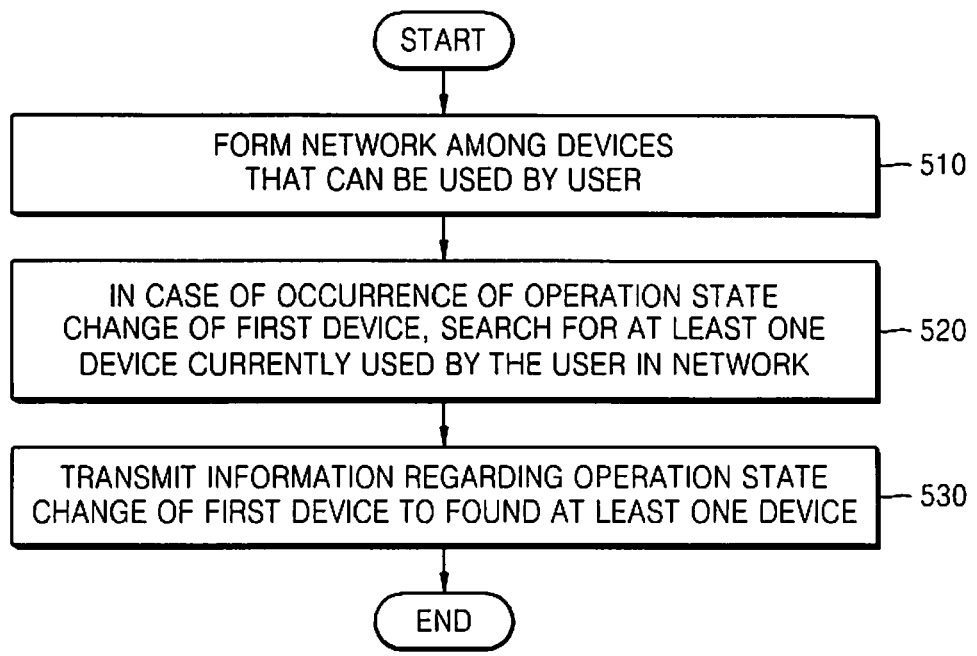
FIG. 5 is a flowchart illustrating a method of notifying an operation state change of a device, according to an embodiment of the present invention.

FIG. 5 is a flowchart illustrating a method of notifying an operation state change of a device, according to an embodiment of the present invention.

In operation 510, a network is formed of devices which can be used by a user and perform network communication. A device of the user may be registered in the network of the devices.

In operation 520, if an operation state of a first device is changed in the network, at least one device, which is currently used by the user, is sought in the network. The first device searches for the device, which is currently used by the user, in the previously formed network.

To search for the currently used device, the first device may request information indicating the current use state of the user from the device, analyze an operation history of the device, or obtain the information indicating the current use state of the user broadcast from the device.

In operation 530, the information indicating the current use state of the user is transmitted to the at least one device found to be currently used by the user. Since the information indicating the operation state change of the first device is displayed on a display unit of the found device, the user may obtain information regarding the operation state change of the first device from a display unit of a second device currently used by the user.

The information regarding the operation state change of the first device may include notification information indicating the occurrence of the operation state change and detail information indicating details of the operation state change. The detail information of the first device may be converted into data in a format that can be reproduced by the second device through the first device or through a server of the network and then transmitted to the second device.

Figure 6:
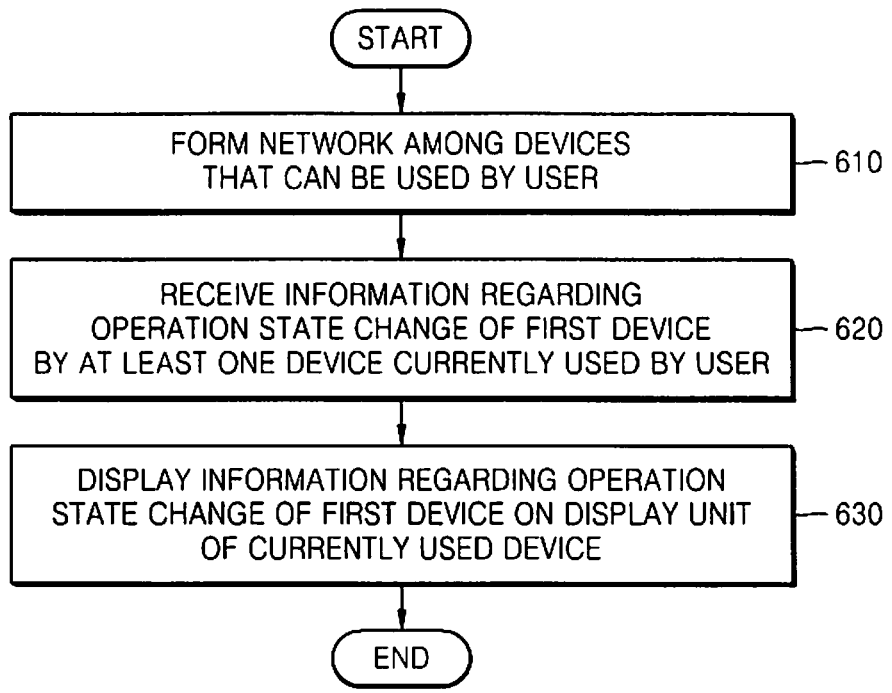
FIG. 6 is a flowchart illustrating a method of notifying an operation state change of another device, according to an embodiment of the present invention.

FIG. 6 is a flowchart illustrating a method of notifying an operation state change of another device, according to an embodiment of the present invention.

In operation 610, a network is formed among devices including a first device and at least one device, which can be used by a user and perform network communication.

In operation 620, at least one device currently used by the user in the network receives information, from the first device, about an operation state change of the first device, which sought the at least one device. The at least one device may receive a search signal indicating a search for the at least one device currently used by the user from the first device.

The device having received the search signal may check if the user is currently using the device. The device currently used by the user may broadcast information indicating whether the user currently uses the device, or the first device may access another device to analyze if the user currently uses the device.

In operation 630, information regarding the operation state change of the first device is displayed on a display unit of the at least one device currently used by the user. The display manner of a notification display window where the information regarding the operation state change of the first device is displayed, such as position, size, transparency, flickering frequency, color, and the like, may be set by a user.

After the device currently used by the user displays the notification display window on the display screen, an acknowledgement may be input from the user. After the user's acknowledgement, detail information indicating details of the operation state change of the first device may be displayed on a display screen of the device currently used by the user.

If the detail information of the first device is in a format that cannot be reproduced by the device currently used by the user, it may be converted into data in a format that can be reproduced by the device currently used by the user and then displayed on the display screen of the device. Alternatively, the detail information of the first device, which has been converted into data in a format that can be reproduced by the currently used device through the first device or a server of the network, may be received by the currently used device. Alternatively, the detail information of the first device may be transmitted after being converted into data in a format that can be reproduced by the display screen of the currently used device, and the currently used device may receive the format-converted detail information and reproduce the detail information indicating the details of the operation state change of the first device on the display screen.

Embodiments of the present invention can be embodied as a program that can be implemented on computers and embedded devices, and that can be implemented on general-purpose digital computers that execute the program using recording media. Examples of the recording media include magnetic storage media, such as Read-Only Memory (ROM), floppy disks, and hard disks, optical data storage devices such as CD-ROMs, and Digital Versatile Discs (DVD).

While the invention has been shown and described with reference with reference to certain embodiments thereof, it will be understood by those of ordinary skill in the art that various changes in form and detail may be made therein without departing from the spirit and scope of the present invention as defined by the appended claims.

What is claimed is:

1. A method of notifying a second device of a message received by a first device, the method comprising the steps of:
   receiving a message by the first device;
   searching for the second device currently connected to the first device, based on a lapse of a predetermined period of time without receiving a user input after receiving the message;
   identifying, by the first device, that the second device is currently connected to the first device through a network; and
   transmitting, by the first device, information regarding the message to the second device,
   wherein the information is displayed on a display unit of the second device.

2. The method of claim 1, further comprising:
   transmitting a search signal to search for at least one device currently used by a user; and
   receiving, from the second device, information indicating that the second device is currently being used by the user, in response to the search signal.

3. The method of claim 1, wherein the information regarding the message includes notification information notifying reception of the message by the first device and detail information indicating details of the message.

4. The method of claim 3, wherein transmitting the information regarding the message comprises:
   converting the detail information into a format for displaying by the second device; and
   transmitting the converted detail information.

5. A first device, comprising:
   a network communication unit configured to receive a message, search for a second device currently connected to the first device, based on a lapse of a predetermined period of time without receiving a user input after receiving the message, and identify that the second device is currently connected to the first device through a network; and
   a transmitting unit configured to transmit, when the message is received by the first device, information regarding the message to the second device,
   wherein the transmitted information is displayed on a display unit of the second device.

6. The first device of claim 5, wherein the network communication unit is further configured to:
   transmit a search signal to search for at least one device currently used by a user; and
   receive, from the second device, information indicating that the second device is currently being used by the user, in response to the search signal.

7. The first device of claim 5, wherein the information regarding the message comprises:
   notification information notifying reception of the message by the first device; and
   detail information indicating details of the message.

8. The first device of claim 7, wherein the transmitting unit is further configured to transmit the information regarding the message by:
   converting the detail information into a format for displaying by the second device; and
   transmitting the converted detail information.

* * * * *